United States Patent [19]
Kuchta

[11] Patent Number: 5,805,777
[45] Date of Patent: Sep. 8, 1998

[54] EXTENDED PRINTER CONTROL INTERFACE

[75] Inventor: Daniel William Kuchta, Brockport, N.Y.

[73] Assignee: Eastman Kodak Company, Rochester, N.Y.

[21] Appl. No.: 656,616

[22] Filed: May 31, 1996

Related U.S. Application Data

[60] Provisional application No. 60/005,206 Oct. 11, 1995.

[51] Int. Cl.⁶ .................................................. G06F 15/00
[52] U.S. Cl. .......................................... 395/112; 395/114
[58] Field of Search .................................... 395/112, 113, 395/114, 101, 115, 117, 133, 501, 840, 670, 677, 109, 102, 828, 830, 835; 358/468, 407, 406, 504; 345/501, 433

[56] References Cited

U.S. PATENT DOCUMENTS

| | | | |
|---|---|---|---|
| 5,157,384 | 10/1992 | Greanias et al. | 340/706 |
| 5,179,666 | 1/1993 | Rimmer et al. | 395/275 |
| 5,257,369 | 10/1993 | Skeen et al. | 395/650 |
| 5,329,619 | 7/1994 | Page et al. | 395/200 |
| 5,371,888 | 12/1994 | Lehnertz et al. | 395/670 |
| 5,467,434 | 11/1995 | Hower, Jr. et al. | 395/114 |
| 5,550,957 | 8/1996 | Davidson, Jr. et al. | 395/114 |
| 5,563,987 | 10/1996 | Scott | 395/115 |
| 5,650,941 | 7/1997 | Coelho et al. | 395/114 |

*Primary Examiner*—Arthur G. Evans
*Assistant Examiner*—Dov Popovici
*Attorney, Agent, or Firm*—Thomas H. Close

[57] ABSTRACT

An improved printer control interface, for use with computer printing system of the type having a central processor, an operating system, a host application, a printer, and a plug in module which receives image export application programming interface (API) calls from the host application for driving the printer, include an extended suite of API calls, having, API support calls, custom user interface calls, printer calls and calibration calls an extended host application for executing the extended suite of API calls; and an extended plug-in module responsive to the extended suite of API calls for controlling the printer.

3 Claims, 4 Drawing Sheets

EXTENDED PRINTER CONTROL INTERFACE

CROSS REFERENCE TO RELATED APPLICATION

Reference is made to and priority claimed from U.S. Provisional Application Ser. No. U.S. 60/005,206, filed 11 Oct. 1995, entitled EXTENDED PRINTER CONTROL INTERFACE.

FIELD OF THE INVENTION

The invention relates generally to the field of digital printing systems, and in particular to printer control interfaces in such systems.

BACKGROUND OF THE INVENTION

Host applications with plug-in architecture, such as Photoshop™ by Adobe Systems Inc. are commonly used to control printers in digital printing systems. The host applications communicate with a plug-in module via an application programmer interface (API) which includes a set of standardized calls. The API sets up a standard way for any host application to communicate with a plug-in module without having to know what goes on inside the plug-in module. Therefore, many host applications can take advantage of the services offered by the plug-in module as long as they adhere to the API.

Presently, API's for printers, such as employed in Photoshop™, are limited to sending images out of a host application to a plug-in module. The standard calls include "About" for causing the plug-in module to activate a display associated with the printing system to display information about the plug-in module; "Prepare" for causing the plug-in module to perform operations needed in preparation for printing such as allocating memory in the plug-in module; "Start" for causing the plug-in module to perform necessary start-up operations such as opening a connection to the printer and requesting the first block of image data from the host application; "Continue" for causing the plug-in module to process the block of image data and send it to the printer and request the next block of image data; and "Finish" for causing the plug-in module to perform any shut down operations such as closing the connection with the printer and deallocating memory.

The Photoshop™ API is becoming a widely used standard interface between applications and plug-in modules. However, it has some shortcomings that inhibit the use of these modules for some important functions that are necessary when communicating to printers, especially color printers. For example, many color printers require calibration which is implemented with printer commands that are very different from those used in normal printing. There are no API calls to initiate calibration from the application. As a result, effort is wasted writing calibration utilities that need to incorporate much of the same communications code that the Photoshop™ module already implements.

In addition, after a printer is in production, developers often discover the need to communicate with the printer from custom applications that have their own specialized user interfaces. Again they need to duplicate code that is already available and debugged inside the Photoshop™ Module.

In summary, a shortcoming with known API's for printers is that there are several functions in addition to sending images out of the host application that are presently performed that require custom applications, such as calibration utilities, and print servers.

SUMMARY OF THE INVENTION

The present invention is directed to overcoming one or more of the problems set forth above. Briefly summarized, according to one aspect of the present invention, an improved printer control interface, for use with a computer printing system of the type having a central processor, an operating system, a host application, a printer, and a plug-in module which receives image export application programming interface (API) calls from the host application for driving the printer, includes an extended suite of API calls, having, API support calls, custom user interface calls, printer calls and calibration calls, an extended host application for executing the extended suite of API calls; and an extended plug-in module responsive to the extended suite of API calls for controlling the printer.

According to the present invention, the extended API, extended host application and extended plug-in modules enable the host application to query the plug-in module as to the current printer setup and the printer's capabilities; send and receive calibration tables to and from the printer; get default calibration tables from the plug-in module; use the plug-in module as a printer driver without invoking the module's user interface; and to use the module's extended selection calls to select a target printer on a network or bus, and return information about that selection to the host application.

The improved printer control interface according to the present invention is advantageous in that it enables a variety of host applications to share an extended plug-in module for performing a variety of functions such as printer calibration, and print serving without having to know what occurs inside the plug-in module. The improved printer control interface has the further advantage that when new printers are introduced, an extended plug-in module can be prepared that will function with existing host applications to provide the extended functionality to the new printers.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
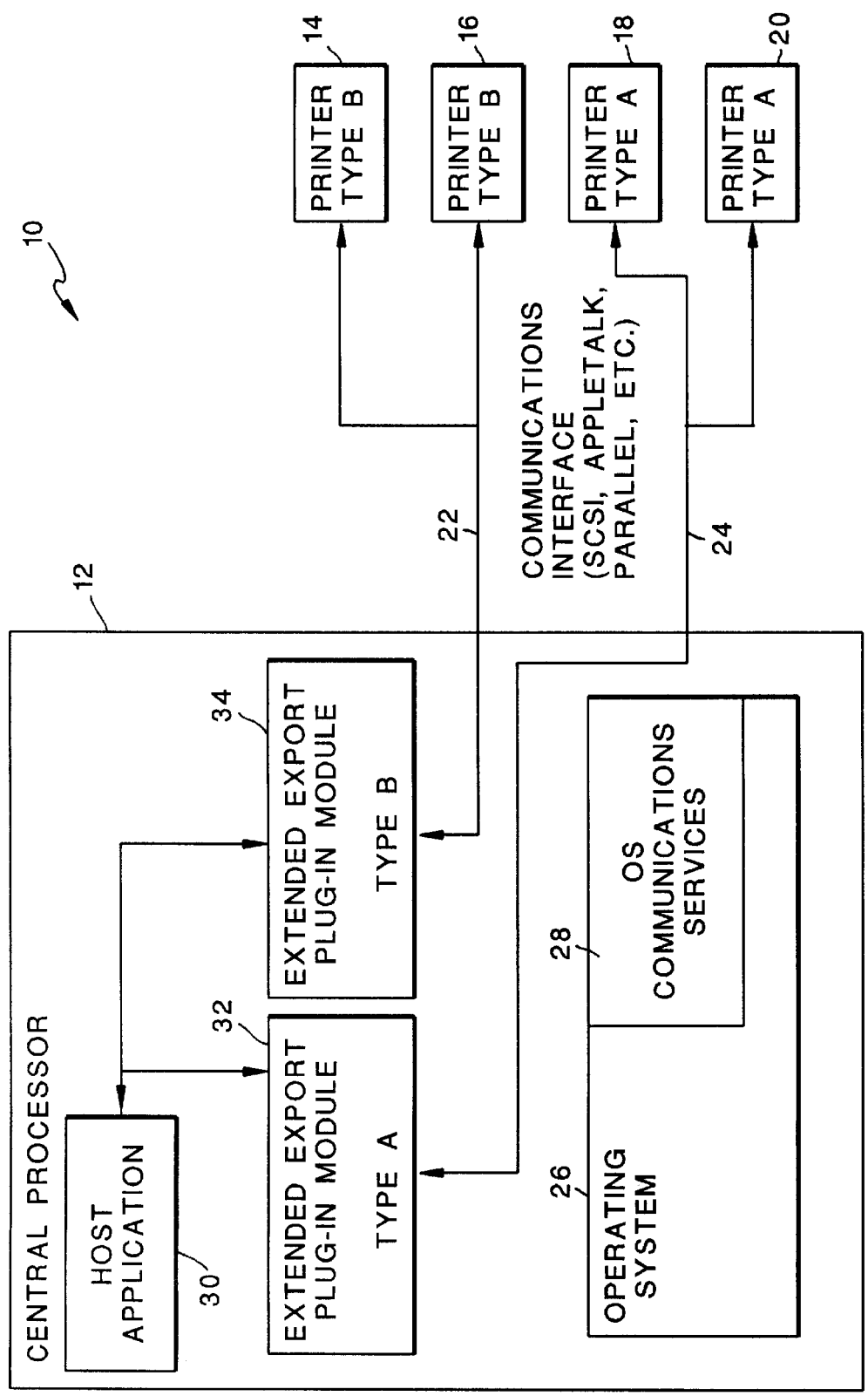
FIG. 1 is a schematic block diagram of a printer system having a printer control interface according to the present invention.

Referring now to FIG. 1, a printing system having a printer control interface according to the present invention is shown. The printing system generally designated 10, includes a central processor 12 such a personal computer that is programmed with a plurality of software modules for controlling a number of printers 14, 16, 18 and 20. The printers 14–20 may employ different printing technologies such as electrophotgraphic, ink jet and thermal dye sublimation, be made by different manufactures, have different feature sets, or employ different command languages. Printers that share the same command language, feature set and printing technology are said to be of the same type. Each printer is connected to the central processor 12 by a communications interface 22 or 24 which may include a SCSI, AppleTalk, parallel, or TCP/IP protocol.

The software modules in the central processor 12 include an operating system 26, such as Windows or MacOS and associated communication services 28 for implementing the communication interfaces. A host application 30 such as an image processing program, a calibration utility, or a print server includes an extension for communicating with one or more extended export plug-in modules 32 and 34. Each extended plug-in module supports a particular printer type and implements its command language.

The extended export plug-in modules 32 and 34 receive image export application programming interface (API) calls from the host application for driving the printers. The extended export module responds to a call by implementing the requested functionality by issuing commands to the printers 14–20 via the communication services module 28. According to the present invention, the extended host application and extended plug-in modules are provided with an extended suite of API calls including support calls, custom user interface calls, printer calls and calibration calls as described in detail below.

Figure 2:
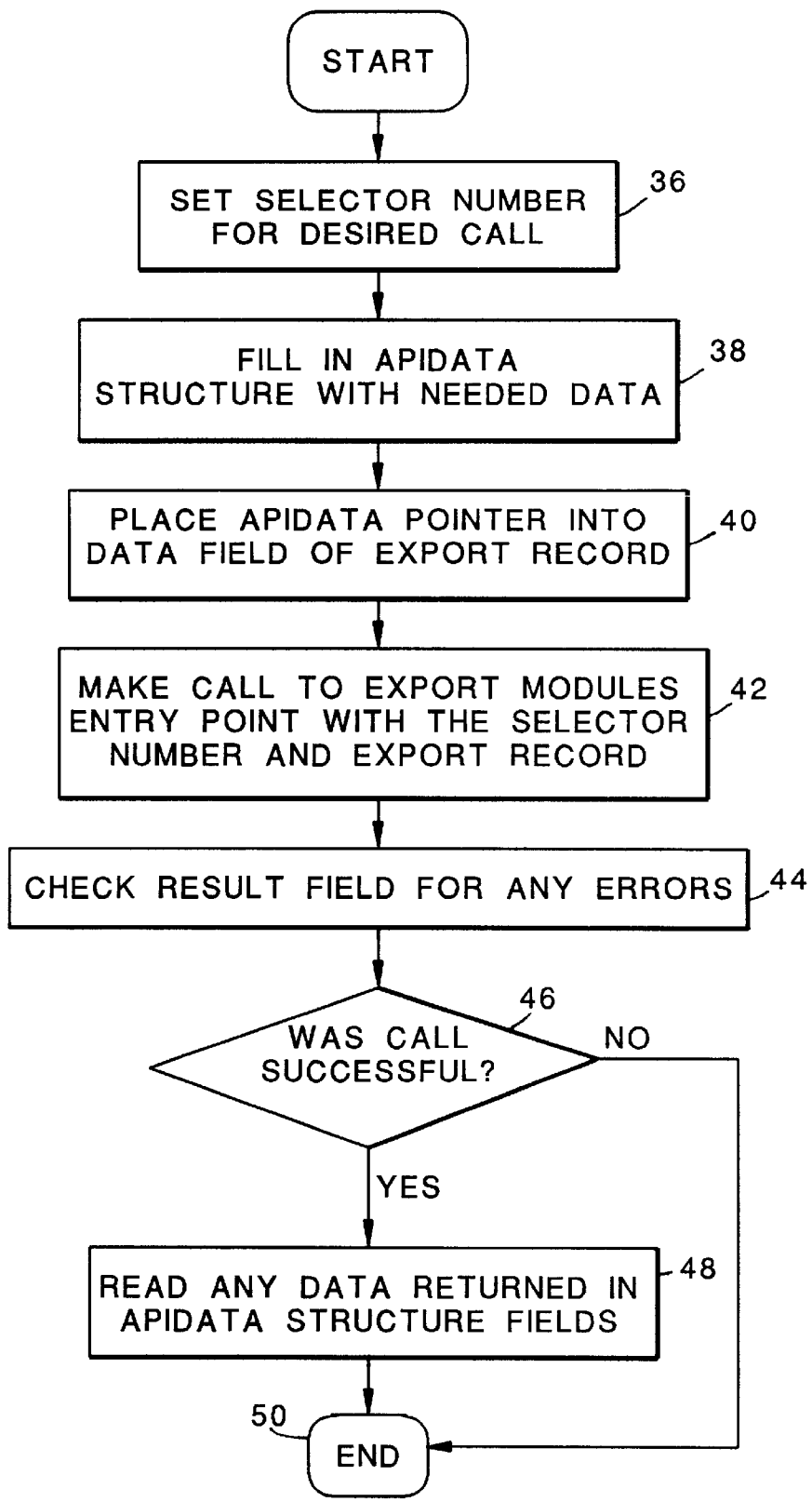
FIG. 2 is a flow chart showing the sequence of operations for a typical call to the printer control interface of the present invention.

Referring to FIG. 2, the procedure for making a typical call from the extended host application to an extended export module will be described. First the host application 30 sets a selector number indicating a desired call to be executed (36). Next the host application fills in an apiData structure with needed data (38). Different calls require different data as described in detail below. The host application places a pointer to the apiData structure into the data field of an Export Record (40). The host application then makes a call to the extended export module's entry point with the selector number and the Export Record (42). Upon return from the call, the host application checks a Result field for any errors (44). If the call was successful (46), the host application reads any data that was returned in the apiData structure fields (48) and ends (50). If the call was not successful, the call ends without return of data, and the host application takes appropriate action.

A complete specification of an extended host application and extended plug-in modules using extended calls according to the present invention will now be described as an extension to the Photoshop API published by Adobe Systems in the Photoshop Developer's Kit Version 3.0 available form Adobe Systems, Inc. 1585 Charlston Rd. Mountain View, Calif.

DEFINITIONS

Fixed Point Notation—Uses a 32-bit long word to specify a whole number in the upper 2 bytes, and a fractional part in the lower 2 bytes. The lower two bytes can be calculated by taking the fractional part of the decimal number and multiplying it times 65,536. The universal type used for a variable of this kind is: Fixed32. Examples:
  1.5=hex 0001 8000
  1.31=hex 0001 4F5C Version Notation—Uses a 32-bit long word to specify a major revision level in the upper byte, a minor revision number in next byte, a bug fix level in the next byte, and the lowest byte is an ASCII character code indicating the development level:
  d (0x64)=development
  a (0x61)=alpha
  b (0x62)=beta
  r (0x72)=release The universal type for a variable of this kind is: Vers32. Examples:
  version 1.31b=hex 01 1F 00 62.
  version 2.8.1=hex 02 08 01 72 (no letter in version infers release)

X and Y—The X and Y dimensions used in the data structures and calls are referenced to the portrait orientation. For example, the xDpi field in a resolution definition data structure would refer to the width of a portrait (tall oriented) image in pixels. This is true even if the printer's natural orientation is landscape.

Calibration—The process of adjusting the printer/media system response so that the printer represents a specific calibration model to the host. This calibration model consists of a minimum and maximum density value, and a gamma value. Many printers are calibrated to a linear model with a gamma of 1.0 so that a linear change in the code values input produce a linear change in the print density.

Color Matching—The process of adjusting the image data (in the host, module, or printer) to make the print closely match a standard, usually the displayed image on the monitor. Color matching is applied after calibrating the printer, and the matching table must be designed to work with the calibration model of the printer. In other words, a color matching table designed for a linearly calibrated printer will not produce a correct print if it is used with a printer that is calibrated to a gamma of 1.8. Note that the word "color" is used loosely here since many times the matching process only needs to adjust gamma and black level and may not involve hue or saturation at all.

BufferID—An opaque type specified in the Photoshop™ SDK. as a reference to memory allocated with the Buffer Suite callbacks. It is called an opaque type because the calling code (the module) doesn't have to know what type it is to be able to use a pointer to it.

Uint8 etc.—Universal type definitions that should clearly indicate their size and type regardless of platform or development environment. The number at the end of the variable always indicates the length of the variable in bits. Some examples are:

Int8 A signed variable 8 bits long.
Uint8 An unsigned variable 8 bits long.
Ptr16 A pointer to a 16 bit variable.
Uptr32 A pointer to a 32 bit variable
Fixed32 A 32 bit variable used in Fixed Point Notation The purpose of the extended Photoshop™ API is to allow additional control over the module's functionality beyond that described in the Photoshop™ Developer's Kit. These extended functions fall into the following categories:

Calibration—printing test prints, reading and writing calibration tables.
  Use of the module as a printer driver, without invoking the module's user-interface.

Selective disabling of the module's user-interface for times when the host application needs to supersede some of its functionality.

The extended interface consists of a series of extra calls that can be made to the module by way of additional selector numbers. These numbers allow access to routines other than the normal "Prepare", "Start", "Continue" etc.

The philosophy is similar to that used in object oriented programming. The Photoshop™ module can be thought of as a class used to communicate with the printer. It contains all the communications code needed to talk to the printer, knows how to send images, read status, perform calibration, and knows the qualities and capabilities of the printer. As long as the calling application knows the interface, it doesn't have to be concerned with the details of how to talk to the printer.

Examples of the new API calls and their selector numbers according to the present invention are listed in Table 1 below.

TABLE 1

API Support
32300 GetAPIVersion—returns version # of the api supported by module
32301 GetAPIList—get a list of the other calls supported
32302 GetModuleInfo—returns information about the module
32303 Cleanup—Frees up resources used by module
Custom User Interface Suite
32001 StartCustom—Start routine with user interface suppression
32002 ContinueCustom—Continue routine with user interface suppression
32003 FinishCustom—Finish routine with user interface suppression
32004 PrepareCustom—Prepare routine with user interface suppression
Printer Suite
32100 GetPrinterInfo—Gets information about the printer
32101 GetStatus—Returns status data structure with printer status
32102 SelectPrinter—Bring up module's user-interface to select printer
32103 SetTargetPrinter—Set the printer that the module will access
32104 GetSetupInfo—returns last job settings used by module
32105 GetFeaturesSupport—identifies features supported by module & printer
32106 GetPageMediaList—get a list of page media types supported
32107 GetMarkingMediaList—get a list of marking media supported
32108 GetResolutionList—get a list of the resolutions supported
32109 GetIcon—gets an icon of the printer for use in the application's user-interface
Calibration Suite
32200 GetCalSlotList—get a list of the calibration types supported
32201 SetCalSlot—Set table refnums for the calibration type
32202 SelectCalSlot—Bring up module's user-interface for cal settings
32210 GetCalTable—Read a calibration table from the printer or module
32211 SetCalTable—Write a calibration table to the printer
32220 GetShapeList—Get a list of shape table refnums
32221 GetShapeTable—Get the speed-shift shape table from the module
32222 SetShapeTable—Set the speed-shift shape table in the module
32223 DeleteShapeTable—Tell the module to delete one of it's shape tables
32230 GetAimsList—Get a list of the Aims Tables available in the module
32231 GetAimsTable—Get an Aims Table
32232 SetAimsTable—Set an Aims Table
32233 DeleteAimsTable—Tell the module to delete one of it's aims tables
32250 ReadMatchTable—Read the default matching table from the module In the Extended API according to the present invention, data is passed in and out of the module by means of the data field in Photoshop's ExportRecord data structure (NOT the data pointer argument to the main call). In a normal API call, this pointer is only used to point to image data. In the Extended API, it points to a data structure which contains the information shown below. Note that the image data pointer has been moved into this data structure so it can still be accessed. The main data structure definitions are shown in Table 2 below.

TABLE 2

```
typedef struct apiDataType {
    void    *imageDataPtr;          // image data
    Int32   kAPINumber;             // data in/out to module
    void    *kAPIDataPtr;           // data in/out to module
    featuresType *UIDataPtr;        // user interface specifier
    void    *extraPtr;              // reserved
} apiDataType, *apiDataPtrType;
```

The fields employed in the main data structure are defined in Table 3.

TABLE 3 imageDataPtr

This is the displaced image data pointer that normally occupies the data field in the ExportRecord.

kAPINumber

Used for various purposes depending on the api call in use.

kAPIDataPtr

Pointer to a data structure. The data structure type varies depending on the api call in use.

UIDataPtr

Pointer to a featureType data structure identifying which parts of the user interface will be enabled or disabled (see featureType data structure below).

The module information data structure is used in the GetModuleInfo call to return information specific to the module. The printerType field is used to return a string specifying the printer, printers or printer family that the module supports. Examples might be:

"XLS8600"

"XL7700, XLT7720"

"Kodak XLS Printers"

The module information data structure definition is shown in Table 4 below.

TABLE 4

```
typedef struct moduleInfoType {
    Vers32    moduleVersion;        // software version of module
    Int8 printerType[32];           // printer or printer family name
} moduleInfoType, *moduleInfoType;
```

The printer information data structure is used for getting information about the currently selected printer. The printer information data structure definition is shown in Table 5 below.

TABLE 5

```
typedef struct printerInfoType {
    Vers32    version;              // printer version number
    Int8 vendor[32];                // vendor name C-string
    Int8 model[32];                 // model name C-string
    Int16    comType;               // communications channel
                                    // 0 = None
                                    // 1 = RS232 Serial
                                    // 2 = Centronics parallel
                                    // 3 = SCSI
                                    // 4 = AppleTalk
                                    // 5 = TCP/IP
    // The following information will be interface-specific:
    Uint32    adr1;
    Uint32    adr2;
    Uint32    adr3;
    Uint32    adr4;
    Int8 adrStr1[64];
    Int8 adrStr2[64];
    Int8 adrStr3[64];
    Int8 adrStr4[64];
} printerInfoType , *printerInfoPtrType ;
```

The fields in the printer information data structure are shown in Table 6.

TABLE 6 vendor[32]
  C-string containing the vendor name. For example for Kodak products, this string will be:
  "Kodak"
model[32]
  C-string containing the printer model name.
version
  Vers32 containing the printer version number.
comType
  Communications channel currently in effect to the target printer. The defined values are:
    0 = None ( used to indicate that no printer has been specified yet )
    1 = RS232 Serial
    2 = Centronics Parallel
    3 = SCSI
    4 = AppleTalk
    5 = TCP/IP
adr and adrStr fields:
  The interface-specific fields are used to specify the address of the current target printer for the comType channel. They are defined for the following interfaces:
    SCSI:

| | |
|---|---|
| adr1 | SCSI bus (or HAC) identifier |
| adr2 | SCSI ID (0–7) |
| adr3 | Logical Unit number |
| adr4 | 0 |
| adrStr1 | 0 |
| adrStr2 | 0 |
| adrStr3 | 0 |
| adrStr4 | 0 |

TABLE 6-continued

AppleTalk:

| | |
|---|---|
| adr1 | Address Block |
| adr2 | 0 |
| adr3 | 0 |
| adr4 | 0 |
| adrStr1 | AppleTalk Zone Name |
| adrStr2 | Device Type |
| adrStr3 | Device Name |
| adrStr4 | 0 |

Centronics Parallel:

| | |
|---|---|
| adr1 | Address Block |
| adr2 | LPT# |
| adr3 | 0 |
| adr4 | 0 |
| adrStr1 | 0 |
| adrStr2 | 0 |
| adrStr3 | 0 |
| adrStr4 | 0 |

* The Status data structure is used to return printer status in a standardized format from the GetStatus call. Information that is not supported in the other fields of this data structure may be returned in the status string field. Note that since the application doesn't know how large the status & error strings might be, the module must allocate memory for them using the Buffer Callbacks and the application will have to dispose of it (after checking to be sure the BufferID's are non-zero). Any fields that cannot be filled by the module will be set to −1, except error codes and string BufferID's which will be set to zero. The data structure status definitions are shown in Table 7.

TABLE 7

```
typedef struct statusType {
    Int32               status;
    Int32               copiesLeft;
    Int32               jobsLeft;
    Int32               totalCopiesLeft;
    Int32               secondsEndOfJob;
    Int32               secondsTillIdle;
    Int16               pageMedia;
    Int16               pagesLeft;
    Int16               markingMedia;
    Int16               markingLeft;
    Int16               resolution;
    Int16               errorCode;
    Int32               prtError;
    Int8_BuffIDType     prtErrorStrBuf;
    Int8_BuffIDType     statusStrBuf;
} statusType , *statusPtrType ;
```

The fields employed in the status data structure are explained in Table 8.

TABLE 8 status

Indicates the current state of activity of the printer.
  The currently defined values are:
    0    Idle. Ready to accept a job.
    1    Busy. Can't accept another job
    2    Processing. Printer is working on a job but can accept another.
    3    Printing. Printer is printing a job but can accept another.
    4    Error. Some error condition exists which is not allowing the printer to be in one of the other states.
  If status is unknown, this field should be set to −1.
copiesLeft of copies left to print in the currently printing job including the currently printing copy. If this information cannot be obtained from the printer, this field should be set to −1.

TABLE 8-continued jobsLeft # of jobs left in the printer's job stream, including the currently printing job. If this information cannot be obtained from the printer, this field should be set to −1.
totalCopiesLeft # of copies left to print in the printer's job stream including the currently printing job & the currently printing copy. If this information cannot be obtained from the printer, this field should be set to −1
secondsEndOfJob Estimated seconds to complete the currently printing job.
This will be the module's best guess based on its knowledge of the printer's print & processing times. It is not guaranteed to be of any specific accuracy. If this information cannot be determined, this field should be set to −1.
secondsTillIdle Estimated seconds to complete all the jobs currently in the printer. This will be the module's best guess based on its knowledge of the printer's print & processing times and number of jobs & copies in the printer. If the number of copies can't be found out for all jobs, it will be assumed that each job consists of 1 copy. As such, this value can be considered a minimum estimated time till the printer is idle. If this information cannot be determined, this field should be set to −1.
pageMedia Reference number for the page media currently loaded in the printer. If this information cannot be determined, this field should be set to −1. To determine the meaning of this reference number the host application will need to issue a GetPageMediaList call and find the data structure in the list with the matching reference number. This data structure will contain the full specification for the page media in use.
pagesLeft This indicates the amount of page media left in the printer. It is defined as the number of prints that can be made with the remaining page media if the user chooses to print the largest prints possible with the currently loaded page media, marking media, and resolution. If this information cannot be determined, this field should be set to −1.
markingMedia Reference number for the marking media currently loaded in the printer. If this information cannot be determined, this field should be set to −1. To determine the meaning of this reference number the host application will need to issue a GetMarkingMediaList call and find the data structure in the list with the matching reference number. This data structure will contain the full specification for the marking media in use.
markingLeft This indicates the amount of marking media left in the printer. It is defined as the number of prints that can be made with the remaining marking media if the user chooses to print the largest prints possible with the currently loaded page media, marking media, and resolution. If this information cannot be determined, this field should be set to −1.
resolution Reference number for the current resolution setting in the printer. If this information cannot be determined, this field should be set to −1. To determine the meaning of this reference number the host application will need to issue a GetResolutionList call and find the data structure in the list with the matching reference number. This data structure will contain the full specification for the resolution in use.

TABLE 8-continued errorCode

This is the standardized error code for the current error condition. These error codes are consistent for any kind of printer and are defined in Appendix A. Note that if any kind of error condition exists at the printer, this field will be non-zero. This is true even in the situation where the error is a minor one that does not generate a status field setting of "error" (4), and the printer can continue printing. If the error condition is not a standard one defined in Appendix A, the value will be −1, and the prtError field will contain the printer-specific error code. If there is no error condition, this field should be set to zero.
prtError This field contains the error code number returned by the printer. It is printer-specific, may or may not relate to the errorCode field, and will only be of value to the host application if it knows the printer's error code numbers. In some cases, these numbers may be defined by the module if the printer does not return error code numbers (i.e. if errors are returned in strings). If the printer error code is not defined, or if no error exists, this field will be set to zero.
prtErrorStrBuf A BufferID for a C-string containing a printer error string. This is a string that may be returned from the printer to indicate errors. Its format is unspecified. The memory for this string is allocated by the module using the Buffer Callbacks and must be disposed of by the host application. If no memory was allocated by the module, this BufferID should be set to zero.
statusStrBuf A BufferID for a C-string containing a Status string. This string should contain any status information that the module wishes to return that is not defined in the other fields of the data structure. Its format is unspecified. The memory for this string is allocated by the module using the Buffer Callbacks and must be disposed of by the host application. If no memory was allocated by the module, this BufferID should be set to zero.

The features information data structure is used to send printer settings to the module when using it as a driver with no (or limited) user-interface. It is also used in the GetSetupInfo call to return the job settings last used by the module, and the GetFeaturesSupport call to find out what features are supported by the module & printer.

The field list in Table 10 below describes the features information data structure used in its normal mode, to send or receive job information. When used with the GetFeaturesSupport command, each field will return one of three values (except where otherwise noted):

0=feature not supported

1=feature supported in export module

2=feature supported at printer

The host application may need to know if a given feature is supported in the module or the printer to determine how long the operation (i.e. sharpening) may take. Note that for some of these fields such as markingMedia and pageMedia being "supported" means being able to select it in the module. Table 9 shows the definition of the features data structure.

TABLE 9

```
typedef struct featuresType {
    Uint32              copies;
    Int16               orientation;
    Int16               mirror;
    Int16               center;
    Int16               invert;
    Int16               sharpen;
    Int16               pageMedia;
    Int16               markingMedia;
    Int16               laminate;
    Int16               brightness;
    Int16               scaleType;
    Fixed32             scalePercentX;
    Fixed32             scalePercentY;
    Fixed32             scalePercentMax;
    Fixed32             scalePercentMin;
    Int16               resolution;
    Int16               reserved (pad);
    calTableType            calTable;
    matchTableType          matchTable;
    Int32               reserved[32];
} featuresType , *featuresPtrType ;
```

The fields used in the feature data structure are described below in Table 10.

Figure 3:
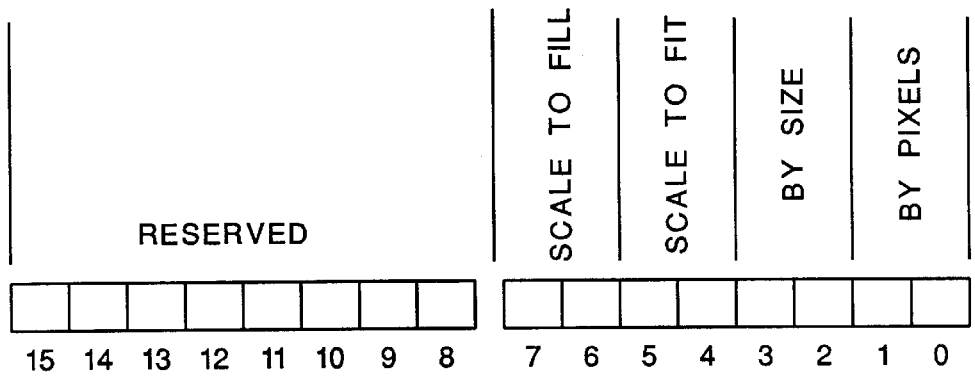
FIG. 3 is a diagram illustrating the bit assignment for a scale type field in the features information structure employed by the interface according to the present invention.

TABLE 10 copies
  Number of copies requested for the job.
  NOTE: when used with GetFeaturesSupport this returns the maximum number of copies that can be requested of the printer.
orientation
  Orientation requested for the job. The following values are defined:
  0=auto orient based on aspect ratio. An aspect ratio of 1:1 should produce the same orientation as a portrait image.
  1=portrait
  2=landscape
mirror
  Flag indicating mirror image is requested for the job.
center
  Flag indicating that the image should be centered in the printable area. If this flag is not set, the image will be in the upper left corner of the printable area.
sharpen
  This field indicates sharpening level requested for the job. The specific amount of sharpening and the algorithm used are up to the module and/or printer. However, the levels defined here should be appropriate for the image types listed below. If a system supports more or fewer choices, they should be mapped to these choices in some appropriate way. For example, if a printer only allows sharpening to be on or off, the 0 and 1 choices might be mapped to "off", while the 2 and 3 choices might be mapped to "on".
  0=no sharpening—an amount appropriate for computer-generated graphics with hard edges.
  1=low sharpening—a level halfway between 0 and 2.
  2=medium sharpening—an amount appropriate to make photographic images look like the originals.
  3=high sharpening—an amount needed to make photographic images look sharper than the originals.
pageMedia
  Reference number for the page media requested. To determine the meaning of this reference number the host application will need to issue a GetPageMediaList call and find the data structure in the list with the matching reference number. This data structure will contain the full specification for the page media referenced.
markingMedia
  Reference number for the marking media requested. To determine the meaning of this reference number the host application will need to issue a GetMarkingMediaList call and find the data structure in the list with the matching reference number. This data structure will contain the full specification for the marking media referenced.
laminate
  Some printers support media with lamination capabilities. This flag specifies whether lamination is used or not. Values are:
  0=laminate not used
  1=laminate used
brightness
  Some printers support printing at various brightness (sometimes called "density") settings which indicate how dark or light the images will be printed. The following values are supported in this interface:
  −3 Lightest
  −2 Lighter
  −1 Light
  0 Normal
  1 Dark
  2 Darker
  3 Darkest
  If the printer supports more or fewer values, they will be mapped by the module to the appropriate level. Note that this may result in several brightness settings producing the same print brightness.
scaleType
  FIG. 3 shows the bit assignments for a scale type field. The scale type field designates the type of scaling requested for the job. The following values are defined for this field:
  0=% By Pixels. This option scales the images by multiplying the pixel size of the image by the scale factor indicated in the scalePercent field. This scaling method will print different sizes on various printers if they have different resolutions. It is dependent only on pixels and ignores any dpi information for the image.
  1=% By Size. This option scales the image by multiplying the scale factor indicated in the scalePercent field by the image size in inches. The image size in inches is determined by dividing the pixel size of the image by the dpi settings for the image. Selecting this option should cause the image to print the same size on any printer regardless of its resolution.
  2=Scale to Fit. This option will scale the image to the maximum size that will fit in the printable area of the selected media without cropping the image or changing the aspect ratio. If the image is not the same aspect ratio of the printable area, some white space will be left in the printable area.
  3=Scale to Fill. This option will scale the image to the minimum size that will fill the printable area with the selected media, without leaving any white space or changing the aspect ratio. If the image is not the same aspect ratio as the printable area, some of the image will be cropped.
  Note: When used with the GetFeaturesSupport call, this field is viewed as four 2-bit fields: Each 2 bit field indicates how the feature is supported:
  00=not supported
  01=supported in export module 10=supported at printer scalePercentX & scalePercentY Percent scaling requested in fixed point format. The x & y directions are referenced to a page in the portrait orientation. This value is used when scaleType is set to 0 or 1. Otherwise it is ignored.

Note: When used with the GetFeaturesSupport call, if the printer does not support independent X & Y scaling, the scalePercentY field will be set to zero, and the scalePercentX will contain:

0=Selecting by percentage is NOT supported at all.

1=Scaling % can be specified and is supported in the module

2=Scaling % can be specified and is supported in the printer

If the printer supports independent X & Y scaling, both fields will be filled with the same value indicating how it is supported.

ScalePercentMax, ScalePercentMin

These fields are read-only and are in fixed-point format. They are only used in the GetFeaturesSupport call to determine the range of allowable percentages for scaling. They are ignored when used with any other call.

resolution

Reference number for the requested resolution setting. To determine the meaning of this reference number the host application will need to issue a GetResolutionList call and find the data structure in the list with the matching reference number. This data structure will contain the full specification for the resolution referenced.

calTable

A calibration table data structure for the Cal Table to be used with the job. If no cal Table is specified, then the dataPtr and matrixDataPtr fields of the calTableType data structure should be set to zero. When used in a GetFeaturesSupport call, the first field of the data structure (crc field) will be set to one of the following values by the module:

0=Use default calibration table.

1=Use the table currently in effect (usually the one used on the previous job).

2=Use no calibration table. For most printers this will mean turning off the printer's calibration table, but for some it may mean the module will download a linear calibration table. This option will normally be used during calibration of the printer.

matchTable

A color matching table data structure for the-match Table to be used with the job. If no match Table is specified, then the dataPtr and matrixDataPtr fields of the matchTableType data structure should be set to zero. When used in a GetFeaturesSupport call, the first field of the data structure (crc field) will be set to one of the following values by the module:

0=Use default color matching table.

1=Use the table currently in effect (usually the one used on the previous job).

2=Use no matching table. For most printers this will mean a linear table with a unity matrix. This option will normally be used during calibration of the printer.

reserved[32]

Reserved for future expansion.

The Page Media data structure is used to define a page media size and type that the printer supports. The page media is the media on which the image is produced such as paper or transparency material. Table 11 shows the definition of the page Media Type data structure.

TABLE 11

```
typedef struct pageMediaType {
    Int16               refNum;
    Uint16              dmin;
    Int8 printerName[64];
    Int8 userName[64];
    Fixed32             xPrintable;
    Fixed32             yPrintable;
    Fixed32             topMargin;
    Fixed32             bottomMargin;
    Fixed32             leftMargin;
    Fixed32             rightMargin;
    Int16               type;
    Int16               weight;
    Int8 color[32];
} pageMediaType , *pageMediaPtrType;
```

The fields employed in the Page Media data structure are described in Table 12.

TABLE 12 refNum

Reference number for the pageMedia. This number is used in API calls that set or get pageMedia for the printer.

dmin

The minimum density that the page media allows times 1000. For example, a dmin of 0.1 would be recorded in this field as a value of 100.

printerName[64]

C-string containing the printer's name for the page media. Some printers require the page media to be specified by a string matching some string stored in the printer. This string is supplied for that purpose.

userName[64]

C-string containing the name for the page media that the user should see in the user interface. This might be different from the printer's name for the same page media.

xPrintable, yPrintable

The x and y dimensions of the printable area for the page media in units of Fixed Point inches. The x & y directions are referenced to a page in the portrait orientation.

topMargin, bottomMargin, leftMargin, rightMargin

The margin sizes for the page media in units of Fixed Point inches. The directions are referenced to a page in the portrait orientation.

type

The type of page media requested. The currently defined values are:

0=paper

1=transparency weight

The page media weight in grams per square meter.

color[32]

A C-string containing the name of the color of the page media stock.

The Marking Media data structure is used to define a marking media type that the printer supports. The marking media is that media which produces the image on the page media. Examples of marking media are toner, ink, thermal dye ribbon, or emulsion (in the case of photographic paper). The Marking Media data structure definition is shown in Table 13.

TABLE 13

```
typedef struct markingMediaType {
    Int16              refNum;
    Int16              dmax;
    Int8 printerName[64];
    Int8 userName[64];
    Fixed32            xprintable;
    Fixed32            yPrintable;
    Int16              type;
    Int16              reserved (pad);
    Int8 colorSequence[32];
    Int16              imageModes[32];
} markingMediaType , *markingMediaPtrType ;
```

The fields employed in the Marking Media data structure are shown in Table 14.

TABLE 14 refNum

Reference number for the marking media. This number is used in API calls that set or get marking media for the printer.

dmax

The maximum density that the marking media can produce times 1000. For example, a dmax of 2.2 would be recorded in this field as a value of 2200.

printerName[64]

C-string containing the printer's name for the marking media . Some printers require the marking media to be specified by a string matching some string stored in the printer. This string is supplied for that purpose.

userName[64]

C-string containing the name for the marking media that the user should see in the user interface. This might be different from the printer's name for the same marking media.

xPrintable, yPrintable

The x and y dimensions of the printable area for the marking media in units of Fixed Point inches. The x & y directions are referenced to a page in the portrait orientation.

type

Type of marking media. The currently defined values for this field are:

0=Ink Jet
1=Laser Toner
2=Thermal Dye Ribbon
3=Wax Ribbon
4=Photographic emulsion
5=Solid Wax colorSequence[32]

This character array contains a PASCAL type string indicating the color sequence of the marking media. As a PASCAL string, the first byte indicates the number of color planes or patches of media. The remaining characters indicate the color sequence using the following letters:

R=Red C=Cyan K=Black
G=Green Y=Yellow L=Clear Laminate
B=Blue M=Magenta imageModes[32]

This is an array describing the image modes supported by this marking media. Note that these might be different for different marking media. In other words, a black-only type of marking media might only support the plugInModeGrayScale image mode, but an RGB marking media would probably support several of the imagemodes. It is up to the module to decide what modes are supported since it might have the capability of converting (for example from RGB to Gray Scale). The currently defined values for this array are the same as those defined in the Photoshop Plug-in kit and are listed below. All locations in the array that do not contain a valid image mode should be filled with −1. The valid image mode values shall be in a contiguous group at the beginning of the array so that the first −1 encountered marks the end of the entries.

plugInModeBitmap 0
plugInModeGrayScale 1
plugInModeIndexedColor 2
plugInModeRGBColor 3
plugInodeCMYKColor 4
plugInModeHSLColor 5
plugInModeHSBColor 6
plugInModeMultichannel 7
plugInModeDuotone 8
plugInModeLabColor 9

The Resolution data structure is used to define a resolution that the printer supports. In some printers, resolution is settable and various resolutions may limit printable area to different numbers of pixels. To determine the maximum printable area for a given printer configuration, you must find the minimum of the printable areas (x and y dimensions) from the current page media, current marking media, and current resolution specifications. The definition of the Resolution data structure is shown in Table 15.

TABLE 15

```
typedef struct resolutionType {
    Int16              refNum;
    Int16              reserved (pad);
    Fixed32            xDpi;
    Fixed32            yDpi;
    Uint32             xPrintable;
    Uint32             yPrintable;
} resolutionType , *resolutionPtrType ;
```

The fields employed in the Resolution data structure are described in Table 16.

TABLE 16 refNum

Reference number for the resolution. This number is used in API calls that set or get resolution for the printer.

xDpi, yDpi

X and Y dots per inch settings for the printer in Fixed Point notation. The x & y directions are referenced to a page in the portrait orientation.

xPrintable, yPrintable

Maximum X and Y printable area in pixels for the specified resolution. The x & y directions are referenced to a page in the portrait orientation.

The Preview data structure is used to pass image preview information to the module for display during printing or calibration. The definition of the preview data structure is shown in Table 17.

TABLE 17

```
typedef struct previewType {
Int8 title[64];
void image;
} previewType , *previewPtrType;
```

The fields employed in the Preview data structure are described in Table 18.

TABLE 18 title

A C-string that can be displayed by the module with the preview image to aid in understanding what will be printed.

image

This is a pointer to the image data that will be displayed by the module. It is declared as a void* since the Mac will use a pointer to a PICT resource while the PC will use a pointer to a BMP. The module is guaranteed to display the image without scaling if it is less than 150 by 150 pixels. Larger images will be displayed but may be cropped or scaled into the 150 by 150 area.

The Calibration Slot data structure is used for specifying which calibration table in the printer will be accessed. A given printer may have memory locations of "slots" for various kinds of calibrations. For example, a printer may have slots to hold a different calibration table for each of the following combinations of media types:

(Example:) Slot 1 Transparency Color

Slot 2 Transparency Gray-Scale

Slot 3 Paper Color

Slot 4 Paper Gray-Scale

The calibration slots available for a printer are defined in Table 19. A list of the supported slots for a specific printer can be obtained with the GetCalSlotList call.

TABLE 19

```
typedef struct calSlotType {
    Int16            refNum;
    Int16            markingRefNum;
    Int16            pageRefNum;
    Int16            resolutionRefNum;
    Int16            aimsTableRefNum;
    Int16            shapeTableRefNum;
    Int8 [64]        calSpecStr0;
    Int8 [64]        calSpecStr1;
    Int8 [64]        calSpecStr2;
    Int8 [64]        calSpecStr3;
    Int8 [64]        calSpecStr4;
    Int8 [64]        calSpecStr5;
} calSlotType , *calSlotPtrType ;
```

The fields employed in the Calibration slot data structure are described in Table 20.

TABLE 20 refnum

This field is a reference number for the calibration slot.

markingRefNum

Reference number for the marking media required for the calibration slot.

pageRefNum

Reference number for the page media required for the calibration slot.

resolutionRefNum

Reference number for the printer resolution required for the calibration slot.

aimsTableRefNum

Reference number for the aims table associated with the calibration slot.

shapeTableRefNum

Reference number for the shape table associated with the calibration slot.

calSpecStr0 through 5

These 6 C-strings are used to identify other options that determine which calibration slot will be used in the printer. For example, a user may have selected a marking media for calibration that has a laminate layer. If the printer allows separate calibration tables for the media with laminate in use or not in use, one of these strings would be used to specify this information.

The text in these strings is provided by the module and should be in a user friendly form. For the example given above, the two options for one of the strings might be:

"ExtraLife: ON"

"ExtraLife: OFF"

The Calibration Table data structure is used for moving calibration tables to and from the printer, and for retrieving the default table. The definition of the Calibration Table data structure is shown in Table 21.

TABLE 21

```
typedef struct calTableType {
    Uint32              crc;
    Int16               whichTable;
    Int16               calSlot;
    Int8 colorSequence[32];
    Uint16              maxValue;
    Int16               matrixCols;
    Int16               matrixRows;
    Uint16              count;
    Int16__BuffIDType           dataBuf;
    Int16__BuffIDType           matrixDataBuf;
} calTableType , *calTablePtrType;
```

The fields employed in the Calibration Table data structure are described in Table 22.

TABLE 22 crc

Cyclic redundancy check value. This value should be calculated by the host application and placed into any table that it creates before sending it to the module. The purpose of this value is to allow a quick test for equivalent tables. If the host application wants to compare a table it has in memory (or on disk) to a table in the module (or printer) it should only have to compare this single value in the two tables to be compared. The crc calculation is specified in Appendix D.

whichTable

This field indicates which table is being accessed. The currently defined values are:

0 Default Table (read & write) This table is specified to be used by the end user as a "calibration-starter" table. It will normally be a resource of the module. Its purpose is to put the printer into the ballpark of being calibrated before initiating a full calibration procedure. There will be one of these for each cal slot.

1 Printer Table (read & write) This is the table that the end-user will normally change to calibrate the printer to the correct response. There will be one of these for each cal slot.

2 Factory Table (read only) Some printers have a Factory default table that can be read from the printer. If the printer does not support this, the table returned should be identical to the Default Table specified above. There may be one of these for each cal slot.

3 Special Some printers have a calibration technique that requires some special information to be written. This value allows some data other than a normal calibration table to be sent to the printer for calibration purposes.

calSlot

Reference number for the type of calibration for which the table was created. To determine the meaning of this reference number, the host application will need to issue a GetCalSlotList call and find the data structure with the matching reference number. This data structure will contain the full specification for the calibration table type. Calibration types can be thought of as locations or "slots" in the printer where a calibration table can be placed. While some printers might support only one table, others will have a "slot" for a table for paper, another for transparency, etc.

colorSequence[32]

This character array contains a PASCAL type string indicating the color sequence of the table data pointed to by the dataPtr field. As a PASCAL string, the first byte indicates the number of color planes in the data. The remaining characters indicate the color sequence using the following letters:

R=Red C=Cyan K=Black
G=Green Y=Yellow
B=Blue M=Magenta maxValue

This field represents the maximum value possible for each entry (commonly 255).

matrixCols

Number of columns in the matrix. Zero if no matrix.

matrixRows

Number of rows in the matrix. Zero if no matrix.

count

This field indicates the number of entries in a LUT for one color (commonly 256).

dataBuf

This field contains a BufferID for the data buffer containing the LUT data. The size of the LUT data butter in bytes will be the number of entries in a LUT times the number of LUTs in the color sequence, times 2:

count * colorSequence[0] * 2 (values are 16 bits)

Depending on which way the table is being moved, the sending software must allocate the matrix & LUT buffers and the receiving software must dispose of it. If the module is allocating the memory, it must use the Buffer Callbacks for this purpose.

matrixDataBuf

This field contains a BufferID for the data buffer containing the matrix data. The size of the matrix data buffer in bytes will be:

matrixCols * matrixRows * 2 (values are 16 bits)

The data in the buffer is in the order of first row, followed by 2nd row, $_{13}$ followed by nth row. Depending on which way the table is being moved, the sending software must allocate the matrix buffer and the receiving software must dispose of it. The Buffer Callbacks must be used to allocate memory if the module is doing it.

The Color Matching Table data structure is used for moving color matching tables such as TableMaker tables to or from the module. This table is used to modify the image data to match the image on the monitor to the calibration model of the printer. The table will only produce correct results if the dmax and dmin fields match those of the current calibration for the printer. The definition of the Color Matching Table data structure is shown in Table 23

TABLE 23

```
typedef struct matchTableType {
    Uint32              crc;
    Int16               whichTable;
    Int16               reserved1; // (pad)
    Int8 colorSequence[32];
    Uint16              dmax;
    Uint16              dmin;
    Int16               matrixCols;
    Int16               matrixRows;
```

TABLE 23-continued

```
    Int16               reserved2; // (pad)
    Uint16              count;
    UInt16_BuffIDType           dataBuf;
    Int16_BuffIDType            matrixDataBuf;
} matchTableType, *matchTablePtrType;
```

The fields employed in the Color Matching Table data structure are described in Table 24.

TABLE 24 crc

Cyclic redundancy check value. This value should be calculated by the host application and placed into any table that it creates before sending it to the module. The purpose of this value is to allow a quick test for equivalent tables. If the host application wants to compare a table it has in memory (or on disk) to a table in the module (or printer) it should only have to compare this single value in the two tables to be compared. The crc calculation is specified in Appendix D.

whichTable

This field indicates which is the table of interest. The currently defined values are:

0 Default table (read only)

This specifies the default table that is provided with the printer.

1 User selected table (read & write)

This specifies the table that the user wants to apply to the current image colorSequence[32]

This character array contains a PASCAL type string indicating the color sequence of the table data pointed to by the LUTDataPtr field. As a PASCAL string, the first byte indicates the number of color planes in the data. The remaining characters indicate the color sequence using the following letters:

R=Red C=Cyan K=Black
G=Green Y=Yellow
B=Blue M=Magenta dmax

This field indicates the dmax value * 1000 for which the table was created. For example, if the table's dmax is 2.2, the value in this field will be 2200.

dmin

This field indicates the dmin value * 1000 for which the table was created. For example, if the table's dmax is 0.1, the value in this field will be 100.

atrixCols

Number of columns in the matrix. Zero if no matrix.

matrixRows

Number of rows in the matrix. Zero if no matrix.

count

This field indicates the number of entries in a LUT for one color (commonly 256).

dataBuf

This field contains a BufferID for the data buffer containing the LUT data. The size of the LUT data buffer in bytes will be:

count * colorSequence[0] * 2 (values are 16 bits)

Depending on which way the table is being moved, the sending software must allocate the LUT buffer and the receiving software must dispose of it. The Buffer Callbacks must be used to allocate memory if the module is doing it.

matrixDataBuf

This field contains a BufferID for the data buffer containing the matrix data. The size of the matrix data buffer in bytes will be:

matrixCols * matrixRows * 2 (values are 16 bits)

The data in the buffer is in the order of first row, followed by 2nd row, _ followed by nth row. Depending on which way the table is being moved, the sending software must allocate the matrix buffer and the receiving software must dispose of it. The Buffer Callbacks must be used to allocate memory if the module is doing it.

The Shape Table data structure is used to define a shape table that is used in calibration of the printer. There is only one shape table for a printer. The definition of the Shape Table data structure is shown in Table 25.

TABLE 25

```
typedef struct shapeTableType {
    Uint32              crc;
    Int16               refNum;
    Uint16              count;
    Int16_BuffIDType    dataBuf;
} shapeTableType , *shapeTableType ;
```

The fields employed in the Shape Table data structure are described in Table 26.

TABLE 26 crc

Cyclic redundancy check value. This value should be calculated by the host application and placed into any table that it creates before sending it to the module. The purpose of this value is to allow a quick test for equivalent tables. If the host application wants to compare a table it has in memory (or on disk) to a table in the module (or printer) it should only have to compare this single value in the two tables to be compared. The crc calculation is specified in Appendix D.

refNum

A reference Number for the shape table.

count

This field indicates the number of entries in the table (commonly 256). This value is usually the same as the number of entries in an aims table for the printer.

dataBuf

This field contains a BufferID for the data buffer containing the shape data. The size of the data butter in bytes will be the number of entries in the table times 2:

count * 2 (values are 16 bits)

The values in this table represent a modification factor of −1.0 to 1.0. The maximum value is 32767 which represents 1.0 and the minimum is −32767 representing −1.

Depending on which way the table is being moved, the sending software must allocate the data buffer and the receiving software must dispose of it. If the module is allocating the memory, it must use the Buffer Callbacks for this purpose.

The Aims Table data structure is used to define an aims table that is used in calibration of the printer. There may be more than one aims table for a printer and are associated with calibration slots by their reference number.

The definition of the Aims Table data structure is shown in Table 27

TABLE 27

```
typedef struct aimsTableType {
    Uint32              crc;
    Int16               refNum;
    Int16               reserved (pad);
    Int8 colorSequence[32];
    Uint16              maxValue;
    Uint16              count;
    Int16_BuffIDType            dataBuf;
} aimsTableType , aimsTableType ;
```

The field employed in the Aims Table data structure are described in Table 28.

TABLE 28 crc

Cyclic redundancy check value. This value should be calculated by the host application and placed into any table that it creates before sending it to the module. The purpose of this value is to allow a quick test for equivalent tables. If the host application wants to compare a table it has in memory (or on disk) to a table in the module (or printer) it should only have to compare this single value in the two tables to be compared. The crc calculation is specified in Appendix D.

refNum

Reference number for the aims table. This number is used in API calls that set or get aims for the printer.

colorSequence[32]

This character array contains a PASCAL type string indicating the color sequence of the table data pointed to by the dataPtr field. As a PASCAL string, the first byte indicates the number of color planes in the data. The remaining characters indicate the color sequence using the following letters:

R=Red C=Cyan K=Black

G=Green Y=Yellow

B=Blue M=Magenta maxValue

This field represents the maximum value possible for each entry (commonly 255).

count

This field indicates the number of entries in a table for one color (commonly 256).

dataBuf

This field contains a BufferID for the data buffer containing the aim data. The size of the aim data butter in bytes will be the number of entries in a table times the number of color planes, times 2:

count * colorSequence[0] * 2 (values are 16 bits)

Depending on which way the table is being moved, the sending software must allocate the aim buffers and the receiving software must dispose of it. If the module is allocating the memory, it must use the Buffer Callbacks for this purpose.

Four API Support Calls are provided in the extended API. The first support call is the GetAPIVersion call (32300). The first step in communicating with the plug-in from a host application is to determine if the extended API is supported. This is accomplished by first looking for a string resource containing the string:

"Kodak extended export API"

If this resource is found, the next step is to call the module with the selector set to GetAPIVersion. After returning from the call, the kAPINumber will contain a version number in Fixed Point notation. The API data type fields for the GetAPIVersion are shown in Table 29.

TABLE 29

| apiDataType fields: | |
|---|---|
| imageDataPtr | 0 |
| kAPINumber | version number (Vers32 format) |
| kAPIDataPtr | 0 |
| UIDataPtr | 0 |
| extraPtr | 0 |

The next API support call is the GetAPIList call (32301). If the host application determines that the api is supported and it is familiar with the version number, the next step is to call the module with the selector set to GetAPIList. After returning from the call, the apiDataType 15 data structure will contain a pointer to a list of long words in the kAPIDataPtr field. Since the host application can't know the number of long words returned, the module must allocate the memory for them (using the Buffer Callbacks) and the host application is responsible for disposing of it. The API data type fields for the GetAPIList are shown in Table 30.

TABLE 30

| apiDataType fields: | |
|---|---|
| imageDataPtr | 0 |
| kAPINumber | number of calls in array |
| kAPIDataPtr | pointer to array of long words * |
| UIDataPtr | 0 |
| extraPtr | 0 |

Figure 4:
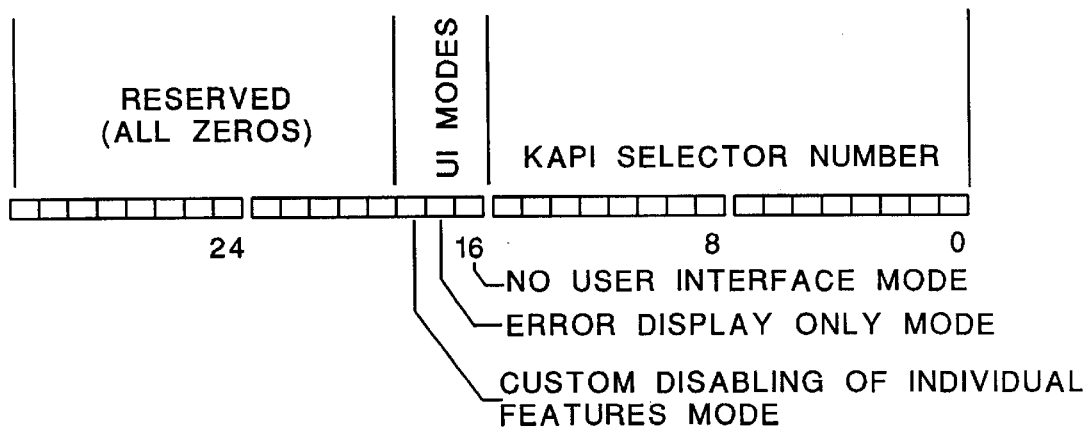
FIG. 4 is a diagram illustrating the bit assignment for a kAPIDataPtr field as used in a GetAPIlist call.

*This is a list of the calls supported. The kAPI selector number is in the lower 2 bytes, and the upper two bytes consist of bit fields that represent possible modes of the calls. Currently, the only call modes supported are for use with the "_Custom" calls. The bit assingnment for the kAPIDataPtr field is shown in FIG. 4. If a bit is set to 1 it indicates that the mode is supported by the module.

The next API support call, the GetModuleInfo call (32302) returns information about the module itself, not necessarily a printer to which it is talking. This includes information such as the module's software version number and a string describing the printer, printers or printer family to which it can communicate. The data fields in the GetModuleInfo call are shown in Table 31.

TABLE 31

| apiDataType fields: | |
|---|---|
| imageDataPtr | 0 |
| kAPINumber | 0 |
| kAPIDataPtr | pointer to a moduleInfoType struct |
| UIDataPtr | 0 |
| extraPtr | 0 |

Finally, the Cleanup call (32303) frees up resources used by the module. In a normal image-printing sequence (prepare, start, continue and finish) the finish routine is responsible for this step. However, in the extended API, the host application can make a variety of calls that do not require the use of the finish call at the end. If the application wants the module to deallocate memory and delete all the objects in use, it can use this call when it is done executing other calls.

A Custom User Interface Suite includes the following calls: PrepareCustom (32004); StartCustom (32001); ContinueCustom (32002), and FinishCustom (32003). Any of these calls can be made to the module with complete or partial user-interface suppression. The host application will first want to issue a GetAPIList call to the module to be sure that the desired user-interface suppression mode is supported. The host application must create one or two featuresType data structures and place pointers to them into the apiDataType data structure as shown in Table 32 below.

TABLE 32

| apiDataType fields: | |
|---|---|
| imageDataPtr | pointer to image data (if required) |
| kAPINumber | User-interface suppression mode |
| | 0 = Display no user interface |
| | 1 = Display only error alerts |
| | 2 = Custom suppression of specific features (use UIDataPtr for specifics) |
| | 3 = Calibration user-interface. Display user-interface appropriate for calibration printing. |
| kAPIDataPtr | pointer to a features Type data structure to indicate desired settings |
| UIDataPtr | pointer to a features Type data structure to indicate specific interface features to be suppressed. |
| extraPtr | pointer to a previewType data structure. |
| kAPIDataPtr featuresType data structure fields: | |
| All fields should be filled in with values to indicate the desired setting for the feature. These values will be used in place of user-selections for any user interface features that are disabled. | |
| UIDataPtr featuresType data structure fields: | |
| All fields filled in with: | |
| 0 indicates the feature's user interface is disabled | |
| 1 indicates the feature's user interface is enabled | |

The featuresType data structure in the kAPIDataPtr field is needed only if the call would normally require user-interface entries by the user. It is filled in to indicate what selections the host application would like to make in place of the user's selections for those features which are not available to the user.

The featuresType data structure in the UIDataPtr field is needed only if the call would normally present a part of the user interface that the host would like to suppress. For example, a Prepare call normally brings up no user-interface (except possibly errors) so this data structure would not be required.

Many times, however, the host application cannot be sure which calls in the API might bring up a userinterface and allow the user to make selections. Therefore, it is a good practice to include these data structure in all the listed calls to cover all possibilities.

The extraPtr is specified for use during the StartCustom call when the kAPINumber is set to 3 to indicate calibration mode.

A set of eight calls called the Printer Suite include the GetPrinterInfo call (32100) which is used to get static information about the currently selected printer. This returns the same information as the SelectPrinter call, it just doesn't invoke the printer selection user-interface. The host application creates a printerInfoData structure and places a pointer to it into the kAPIDataPtr field of the apiDataType data structure. Upon return, the fields will have been filled in by the module. The fields in the GetPrinterInfo call are shown in Table 33.

TABLE 33

| apiDataType fields: | |
|---|---|
| imageDataPtr | 0 |
| kAPINumber | 0 |
| kAPIDataPtr | pointer to a printerInfoType data structure |
| UIDataPtr 0 | |
| extraPtr 0 | |

The GetStatus call (32101) is used to determine the current condition of the printer. The host application must create a statusType data structure and place a pointer to it into the apiDataType data structure shown in Table 34.

TABLE 34

| apiDataType fields: | |
|---|---|
| imageDataPtr | 0 |
| kAPINumber | 0 |
| kAPIDataPtr | pointer to a statusType data structure |
| UIDataPtr 0 | |
| extraPtr 0 | |

Upon return, the data structure will be filled in with the appropriate data by the module. Any fields that cannot be filled by the module will be set to −1, except error codes and string pointers which will be set to zero. Note that since the module allocates memory (using the Buffer Callbacks) for the string pointers, the host application should check for non-zero upon return, and dispose of the memory if they are valid pointers.

The SelectPrinter call (32102) is designed to allow a user to select a printer from the host application.

Usually, the ability to select a target printer is part of the general user-interface that lets the user select printing options for his job. However, a host application may want to suppress the module's user-interface for normal printing operations, but still need to make use of the its user-interface to select a printer. The host application must create a printerInfoType data structure and place a pointer to it into the kAPIDataPtr field of the apiDataType data structure shown in Table 35.

TABLE 35

| apiDataType fields: | |
|---|---|
| imageDataPtr | 0 |
| kAPINumber | 0 |
| kAPIDataPtr | pointer to a printerInfoType data structure |
| UIDataPtr 0 | |
| extraPtr 0 | |

Upon return from the call, the data structure's fields will have been filled in by the module.

The SetTargetPrinter call (32103) allows the host application to set the printer that the module will talk to. It provides the host application with the capability of talking to multiple printers of the same type using one module. The host application must create a printerInfoType data structure, fill it in, and place a pointer to it into the kAPIDataPtr field of the apiDataType data structure.

An example of the use of this call would be in a Printer-Server Application. The application might use the SelectPrinter call several times if a user wants to select several printers of the same type to which the applicationlication may print. The application would save a printerInfoType data structure for each of the printers selected. When a job is sent the application would use SetTargetPrinter with one of the printerInfoType data structures, letting the module know to which printer it should send the job. This call is designed to be used only between jobs. If the target printer is changed during the course of a job, the behavior of the module and/or printer is unspecified and will likely result in some kind of error. There is nothing in the API that prevents this call from being made at an inappropriate time so it is the host application's responsibility to use it correctly. The apiDataType fields for the SetTargetPrinter call are shown in Table 36.

TABLE 36

| apiDataType fields: | |
|---|---|
| imageDataPtr | 0 |
| kAPINumber | 0 |
| kAPIDataPtr | pointer to a printerInfoType data structure |
| UIDataPtr 0 | |
| extraPtr 0 | |

Upon return from the call, the data structure's fields will have been filled in by the module.

GetSetupInfo call (32104) is used to get the settings used by the last job sent to the printer. The host application creates a featuresType data structure and places a pointer to it into the kAPIDataPtr field of the apiDataType data structure shown in Table 37. Upon return, the fields will have been filled in by the module.

TABLE 37

| apiDataType fields: | |
|---|---|
| imageDataPtr | 0 |
| kAPINumber | 0 |
| kAPIDataPtr | pointer to a featuresInfoType data structure |
| UIDataPtr 0 | |
| extraPtr 0 | |

The GetFeaturesSupport call (32105) is used to determine which features are supported by the module and/or printer. The host application creates a featuresType data structure and places a pointer to it into the kAPIDataPtr field of the apiDataType data structure. Upon return, the kAPIDataPtr fields will have been filled in by the module with values indicating which features are supported and how (see description of featuresType data structure). The fields employed in the GetFeaturesSupport call are shown in Table 38.

TABLE 38

| apiDataType fields: | |
|---|---|
| imageDataPtr | 0 |
| kAPINumber | 0 |
| kAPIDataPtr | pointer to a featuresInfoType data structure |
| extraPtr 0 | |

A set of Capability list calls (GetPageMediaList (32106), GetMarkingMediaList (32107), and GetResolutionList (32108) are provided. These calls are implemented to allow the host application to determine the capabilities of the printer in case it wants to display them to the user in its own user-interface. It is important to understand that these lists contain only those capabilities that users can know about! For example, if a printer allows loading of several sizes of paper, but the user can't specify the paper he wants to print on, and he can't ask the printer what is loaded, then the GetPageMediaList will return zero.

All of these calls use the kAPINumber field of the apiDataType data structure to specify the length of the list. A pointer to the list is placed into the kAPIDataPtr field. The fields used in the Capbility list calls are shown in Table 39.

TABLE 39

| apiDataType fields: | |
|---|---|
| imageDataPtr | 0 |
| kAPINumber | Number of items in the array |
| kAPIDataPtr | BufferID for array of items of the type in use |
| UIDataPtr 0 | |
| extraPtr 0 | |

Since the host application can't know the length of the array, the module will allocate memory for it (using the Buffer Callbacks) and the host application is responsible for disposing of it. The contents of the list is dependent upon the specific call in use:

| GetPageMediaList | pageMediaType data structures |
| GetMarkingMediaList | markingMediaType data structures |
| GetResolutionList | resolutionType data structures. |

The GetIcon call (32109) is used to get an icon of the printer from the module. The format of this icon is platform-dependent and is generally used by the host application to display the printer in its user-interface. The module will allocate memory for the icon (using the Buffer Callbacks) and place a pointer to it into the kAPIDataPtr field. The host application is responsible for disposing of the memory if the pointer comes back valid. The fields used in the GetIcon call are shown in Table 40.

TABLE 40

| apiDataType fields: | |
|---|---|
| imageDataPtr | 0 |
| kAPINumber | 0 |
| kAPIDataPtr | BufferID for an icon |
| UIDataPtr 0 | |
| extraPtr 0 | |

A Calibration Suite of 14 calls is provided for controlling printer calibration. The GetCalSlotList call (32200) gets a list of the calibration slots defined in the printer. This call uses the kAPINumber field of the apiDataType data structure to specify the length of the list. A pointer to the list is placed into the kAPIDataPtr field. The fields employed by the GetCalSlotList call are shown in Table 41.

TABLE 41

| apiDataType fields: | |
|---|---|
| imageDataPtr | 0 |
| kAPINumber | Number of cal slots in the array |
| kAPIDataPtr | BufferID for array of cal slot structs |
| UIDataPtr 0 | |
| extraPtr 0 | |

Since the host application can't know the length of the array, the module will allocate memory for it (using the Buffer Callbacks) and the host application is responsible for disposing of it.

The SetCalSlot call (32201) sets some of the parameters for a cal slot. Note that cal slots are an inherent characteristic of the printer and therefore cannot be deleted, added, or have their fundamental definition modified by the host application. However, each cal slot has a related aims and shape table specified by their refnums. The relationship between the cal slot and these tables can be modified by using this call to change the tables referenced from the cal slot. This call uses the kAPINumber field of the apiDataType data structure to specify the refNum of the cal slot to be modified. A pointer to the calSlotType data structure is placed into the kAPIDataPtr field. Note that the only fields in the calSlotType data structure which are required by this call are: aimsTableRefNum andshapeTableRefNum. All other fields are ignored. The fields employed in the SetCalSlot call are shown in Table 41.

TABLE 41

| apiDataType fields: | |
|---|---|
| imageDataPtr | 0 |
| kAPINumber | calSlotRefNum |
| kAPIDataPtr | pointer to a cal slot struct |
| UIDataPtr 0 | |
| extraPtr 0 | |

The SelectCalSlot call (32202) brings up the module's user-interface to allow a user to select one of the calibration slots available in the printer and return its reference number to the host application. A calibration slot is a location in the printer where one kind of table can be stored. The various tables in the printer are differentiated by such things as which marking media, page media, resolution, etc. for which they are used. The module's user-interface for this call should allow the user to select the calibration slot by choosing the appropriate items (page media, marking media, etc.) This user-interface should include only those selections which are used to uniquely define one slot. For example, if the size of the paper does not affect calibration and the printer does not have calibration slots for various sizes of paper, then paper size should not be presented in the user-interface. If only one kind of table is allowed for a printer, no user-interface is brought up by the module, and a 1 is returned for the calSlotRefNum. The fields employed by the SelectCalSlot call are shown in Table 42.

TABLE 42

| apiDataType fields: | |
|---|---|
| imageDataPtr | 0 |
| kAPINumber | calSlotRefNum |
| kAPIDataPtr | 0 |
| UIDataPtr 0 | |
| extraPtr 0 | |

Upon return from the call, the data structure's fields will have been filled in by the module.

The GetCalTable call (32210) is used to read a calibration table from the printer. Since the host application can't know the size or format of the calibration table from the printer, the module must allocate memory for the table data (using the Buffer Callbacks) and the host application will have to dispose of it. The host application creates a calTableType data structure and places a pointer to it into the kPIDataPtr field of the apiDataType data structure. This call can also be used to determine the format of the required cal table before using the SetCalTable call. After making this call, you can examine the fields in the returned data structure to get the size & number of color planes for the required cal table. The fields employed by the call are shown in Table 43.

TABLE 43

| apiDataType fields: | |
|---|---|
| imageDataPtr | 0 |
| kAPINumber | 0 |
| kAPIDataPtr | pointer to a calTableType data structure |
| UIDataPtr 0 | |
| extraPtr 0 | |

The host application should fill in the whichTable field to specify to the printer which kind of table it wants to read. The module will fill in all the appropriate data for the specified table. If the specified table is not supported by the module or printer, the matrixDataPtr and the LUTDataPtr will both be set to zero.

The SetCalTable call (32211) is used to send a calibration table to the printer to change its calibration point. The host application creates a calTableType data structure, fills in the calibration data, and places a pointer to it into the kAPIDataPtr field of the apiDataType data structure. To determine the format of the cal table for the module & printer in use, issue the GetCalTable first, and then examine the fields in the data structure returned to get the size and number of color planes for the required cal table. The fields employed in the call are shown in Table 44.

TABLE 44

| apiDataType fields: | |
|---|---|
| imageDataPtr | 0 |
| kAPINumber | 0 |
| kAPIDataPtr | pointer to a calTableType data structure |
| UIDataPtr 0 | |
| extraPtr 0 | |

The GetShapeList call (32220) gets a list of the Shapes Tables defined in the module. It is normally used only when re-establishing a complete set of tables from a disk file. If the host application is replacing all the tables, it would first issue this call to get a list of available tables, then use the DeleteShapeTable call on each to remove them, and finally issue a SetShapeTable call for each of the new tables to be added to the module. This call uses the kAPINumber field of the apiDataType data structure to specify the length of the list. A pointer to the list is placed into the kAPIDataPtr field. The fields employed in the call are shown in Table 45.

TABLE 46

| apiDataType fields: | |
|---|---|
| imageDataPtr | 0 |
| kAPINumber | Number of shape shapeTableType data structures in the array |
| kAPIDataPtr | pointer to array of shapeTableType data structures |
| UIDataPtr 0 | |
| extraPtr 0 | |

Since the host application can't know the length of the array, the module will allocate memory for it (using the Buffer Callbacks) and the host application is responsible for disposing of it. Similarly, the module will allocate memory for each of the aims table's data pointers and the host will have to dispose of it.

The GetShapeTable call (32221) is used to get the shape table from the module. The module has one shape table for its printer and is responsible for storing it for retrieval by the host application. The shape table is used for speed-shift calibration. The host application creates a shapeTableType data structure and places a pointer to it into the kAPIDataPtr field of the apiDataType data structure. Since the host application doesn't know the size of the table, the module is responsible for allocating the memory for the data pointer (using the Buffer Callbacks) and the application will have to dispose of it. The fields used in the call are shown in Table 47.

TABLE 47

| apiDataType fields: | |
|---|---|
| imageDataPtr | 0 |
| kAPINumber | 0 |
| kAPIDataPtr | pointer to a shapeTableType data structure |
| UIDataPtr 0 | |
| extraPtr 0 | |

The SetShapeTable call (32222) is used to set the data in an existing shape table, or to add a new shape table to the module. If the refNum field does not match an existing shape table, the module assumes that the host application is adding a new one. The shape table is used for speed-shift calibration. The host application creates a shapeTableType data structure, fills in the fields and data, and places a pointer to it into the kAPIDataPtr field of the apiDataType data structure. The fields used in the call are shown in Table 48.

TABLE 48

| apiDataType fields: | |
|---|---|
| imageDataPtr | 0 |
| kAPINumber | 0 |
| kAPIDataPtr | pointer to a shapeTableType data structure |
| UIDataPtr 0 | |
| extraPtr 0 | |

The DeleteShapeTable call (32223) tells the module to delete an existing shape table. Note that it is the host application's responsibility to be sure that all cal slots contain valid references to shape tables before using any call that needs one. If the host application deletes a shape table, it should check all cal slots for references to the deleted table, and be sure they are changed, using the SetCalSlot call, to a valid shape table. The fields used in the call are shown in Table 49.

TABLE 49

| apiDataType fields: | |
|---|---|
| imageDataPtr | 0 |
| kAPINumber | 0 |
| kAPIDataPtr | refNum for shape table to be deleted |
| UIDataPtr 0 | |
| extraPtr 0 | |

The GetAimsList call (32230) gets a list of the Aims Tables defined in the printer. It is normally used only when re-establishing a complete set of tables from a disk file. If the host application is replacing all the tables, it would first issue this call to get a list of available tables, then use the DeleteAimsTable call on each to remove them, and finally issue a SetAimsTable call for each of the new tables to be added to the module. This call uses the kAPINumber field of the apiDataType data structure to specify the length of the list. A pointer to the list is placed into the kAPIDataPtr field. The fields used by the call are shown in Table 50.

TABLE 50

| apiDataType fields: | |
|---|---|
| imageDataPtr | 0 |
| kAPINumber | Number of refnums in the array |
| kAPIDataPtr | array of aims table renums (Int16) |
| UIDataPtr | 0 |
| extraPtr | 0 |

Since the host application can't know the length of the array, the module will allocate memory for it (using the Buffer Callbacks) and the host application is responsible for disposing of it.

The GetAimsTable call (32231) is used to get an aims table from the module. The module may have several aims tables for its printer and is responsible for storing them for retrieval by the host application. The aims tables are used when calibrating the printer. The host application creates an aimsTableType data structure and places a pointer to it into the kAPIDataPtr field of the apiDataType data structure. Since the host application doesn't know the size of the table, the module is responsible for allocating the memory for the data pointer (using the Buffer Callbacks) and the application will have to dispose of it. The fields used in the call are shown in Table 51.

TABLE 51

| apiDataType fields: | |
|---|---|
| imageDataPtr | 0 |
| kAPINumber | 0 |
| kAPIDataPtr | pointer to an aimsTableType data structure |
| UIDataPtr | 0 |
| extraPtr | 0 |

The SetAimsTable call (32232) is used to set the data in an existing aims table, or to add a new aims table to the module. If the refNum field does not match an existing aims table, the module assumes that the host application is adding a new one. The aims tables are used when calibrating the printer. The host application creates an aimsTableType data structure, fills in the fields and data, and places a pointer to it into the kAPIDataPtr field of the apiDataType data structure. The fields used in the call are shown in Table 52.

TABLE 52

| apiDataType fields: | |
|---|---|
| imageDataPtr | 0 |
| kAPINumber | 0 |
| kAPIDataPtr | pointer to an aimsTableType data structure |
| UIDataPtr | 0 |
| extraPtr | 0 |

The DeleteAimsTable call (32233) tells the module to delete an existing aims table. Note that it is the host application's responsibility to be sure that all cal slots contain valid references to aims tables before using any call the needs one. If the host application deletes an aims table, it should check all cal slots for references to the deleted table, and be sure they are changed, using the SetCalSlot call, to a valid aims table. The fields used in the call are shown in Table 53.

TABLE 53

| apiDataType fields: | |
|---|---|
| imageDataPtr | 0 |
| kAPINumber | 0 |
| kAPIDataPtr | refNum for aims table to be deleted |
| UIDataPtr | 0 |
| extraPtr | 0 |

The ReadMatchTable call (32250) is used to read the default color matching table from the printer or module. Since the host application can't know the size or format of the matching table from the printer, the module must allocate memory for the table data (using the Buffer Callbacks) and the host application will have to dispose of it. The host application creates a matchTableType data structure and places a pointer to it into the kAPIDataPtr field of the apiDataType data structure. This call normally used to determine the format of the required matching table before sending a job to the printer with the table. After making this call, you can examine the fields in the returned data structure to get the size & number of color planes for the required cal table. The fields used with the call are shown in Table 54.

TABLE 54

| apiDataType fields: | |
|---|---|
| imageDataPtr | 0 |
| kAPINumber | 0 |
| kAPIDataPtr | pointer to a matchTableType data structure |
| UIDataPtr | 0 |
| extraPtr | 0 |

The whichTable field is ignored during this call since the only table returned is the default table.

A set of Photoshop™ Callbacks must be supported by the host application for it to be considered in compliance with the Photoshop Extended API. The Photoshop Callbacks include Basic Callbacks and a Buffer Suite. The Basic callbacks are the routines that most modules will use and have been supported by Photoshop since its early versions, they include:

TestAbort—The plug-in module will be calling this during long operations to see if the user aborted the operation. The host application should check for any events that would cancel the operation (such as command-period on the Mac), and return TRUE if any are detected; and Update Progress—The host application should support some kind of progress indicator that will be updated when the module calls this routine.

The Buffer Suite callbacks need to be supported for two reasons. First, the module can be more accurate (and conservative) about estimating its memory needs during the DoPrepare call if it can allocate buffers on the fly using these calls and rely on the host application to supply the memory however it sees fit. This also allows the host application to use real RAM, or virtual memory if it desires, shuffling around resources, code, etc. as needed. Second, since many of the extended API calls require that the module allocates memory and the host disposes of it, there can be conflicts in memory management techniques. Problems may arise if the module and host do not use the same kinds of memory management calls. If the module can call the host to allocate space, and the host is responsible for disposing of it when the module returns, then the host has control over both ends of the operation and can be sure everything is done correctly. The following calls must be supported by the host:

AllocateBuffer
LockBuffer
UnlockBuffer
FreeBuffer
BufferSpace

It is important to understand how memory is referenced with these calls to use the Extended API correctly. The first point is that the AllocateBuffer call does not return a pointer to the memory that the host application allocated. Instead it returns a BufferID which is a pointer to an opaque type. The LockBuffer call must be made to the host application to get lock the memory and get a pointer to it.

It is not specified in the Photoshop™ API exactly what this BufferID points to in the host application, since it is an opaque type, and indeed the host application is free to implement this in any way it sees fit. However, one can speculate that the host application might keep a buffer information data structure around that has fields related to the memory that was allocated such as:

Pointer to the memory
Size of the buffer
Locked/Unlocked status
etc.

The BufferID would be a pointer to the buffer info data structure and would be a convenient way for the host application to manage all the buffers it has allocated. The upshot of all this is that the only link to the allocated memory upon which both the host application and the module can rely is the BufferID, not the pointer. Therefore, when the module must allocate memory and the host application must deallocate it, the variable passed to the host application to specify the memory is the BufferID, not a pointer. You will notice these BufferId's in many of the data data structures for this purpose.

The use of the extended API according to the present invention will now be described. First, the printer/module capabilities are determined using the following checks.

Check for API support

The first task most applications will want to perform is finding out if the module supports the Extended API at all. This is done by looking for the kAPI resource and checking to make sure that it contains the specified string. The next step is to use the GetAPoVersion call to be sure. that your application is compatible with the currently supported version in the module. You should then issue a GetAPIList call to determine if the desired calls are supported. (Note that the data returned by this call also indicates what user-interface options are available for the calls supported.)

For example, if the application is a calibration utility, it should check to see if the module supports the suite of calibration related calls before attempting to use the module.

Determine features

Most applications will also want to know what printing features are available at the printer and/or module. Since some features will take a long time to execute if they are implemented in the module instead of the printer, the application will want to know this to decide whether or not to use the feature. The GetFeaturesSupport call will return a data structure indicating what features are supported and whether they are implemented in the printer or module.

Determine Capabilities

Most applications will also need to know about printing capabilities such as papers supported, printable areas etc. These can be determined by issuing the GetPageMediaList, GetMarkingMediaList, and GetResolutionList calls. The printable area can be dependent on the currently selected Page Media, Marking Media, and Resolution. Use the GetStatus call to determine the current media and resolution. Then find the smallest printable area from the printable areas found in the current Page Media, Marking Media, and Resolution in the printer.

If the module is being used as a printer-driver with its user-interface suppressed, it is still necessary to select a target printer for the module to talk to. The module generally has user-interface code in it to let the user select a printer when used as a normal Photoshop module. However, this code is usually part of the Start routine which also has the rest of the user-interface in it. Since it would be desirable to suppress the Start routine's user-interface when using the module as a printer-driver, this would preclude access to the printer selection interface.

The SelectPrinter call has been provided to solve this problem. If the module supports this call, it will bring up the printer selection user-interface and let the user select a target printer. It will then return information relevant to the address of the selected printer.

Some applications such as printer servers may want to be able to make use of several printers of the same kind at different addresses on the bus or network. Once the addresses of the printers are established by using the SelectPrinter call, the application can use the SetTargetPrinter call to specify which printer the module will subsequently talk to.

The SetTargetPrinter call is designed to be used only between jobs. If the target printer is changed during the course of a job, the behavior of the module and/or printer is unspecified but will likely result in some kind of error. There is nothing in the API that prevents this call from being made at an inappropriate time so it is the host application's responsibility to use it correctly.

A custom user interface may need to be suppressed. The first step is to determine if a given API call supports the various user-interface suppression modes:

No user interface at all
Error display only
Custom disabling of features (errors are displayed)
Calibration user-interface. Used for calibration printing.

The GetAPIList call returns this information for the API calls that are supported.

When sending a job to the printer, use the PrepareCustom, StartCustom, ContinueCustom, and FinishCustom calls instead of the normal Photoshop API calls. To set the user-interface to one of the full suppression modes set the kAPINumber field in the apiDataType data structure to:

0=Display no user interface
1=Display only error alerts

To suppress only specific features of the userinterface, set the kAPINumber field in the apiDataType data structure to 2. Then fill in the featuresType data structure in the UIDataPtr field with values indicating which features to suppress. The normal user-interface-will be displayed, with the specified features disabled.

The feature-specific user-interface suppression should be used sparingly. If more than a few features need to be suppressed, it would probably make more sense to implement a custom user-interface in the host application and suppress the entire user-interface in the module.

In either the full-suppression or feature-specific suppression modes, remember that the user can no longer specify the desired settings for the suppressed features. It is therefore important to also fill in the featuresType data structure in the kAPIDataPtr field of the apiDataType data structure with the desired settings for the suppressed features. The module will support default values for all features, but there is no way for the host application to know what the defaults are.

Note that the Prepare, Continue, and Finish calls in the Photoshop API do not normally have a user-interface (except possibly error alerts). So when making these calls, it usually makes sense to use one of the full suppression modes and not worry about filling in the UIDataPtr data structure.

The last mode is Calibration user-interface and is specified by setting the KAPINumber field in the apiDataType data structure to 3. This mode is designed to be used when making a test print from a calibration application. Normally, a calibration application will first call SelectCalSlot to let the user make setup choices for the printer to determine which cal table in the printer he is going to modify. These selections may be such things as transparency vs. paper, color vs. Gray Scale printing, etc. that will have an effect on the calibration of the printer.

After these selections are made, the user will probably need to make a test print of some kind by sending an image job to the printer. The normal print interface is inappropriate since it will include choices that have already been made with the SelectCalSlot call. However, there may things (such as page media size) that have no effect on the calibration, but must still be setup by the user before printing. If this mode is in effect during the StartCustom call, the module will bring up a printing-type dialog which will be a subset of the standard printing dialog to allow the user to make these selections. If no selections are needed, the module will simply execute the StartCustom routine without a user-interface being invoked. This mode is designed with the StartCustom call in mind, but other calls may also need to do something differently during a calibration test print. It is a good practice to use this mode for all calls during a job if it is used for any one of them.

Figure 5:
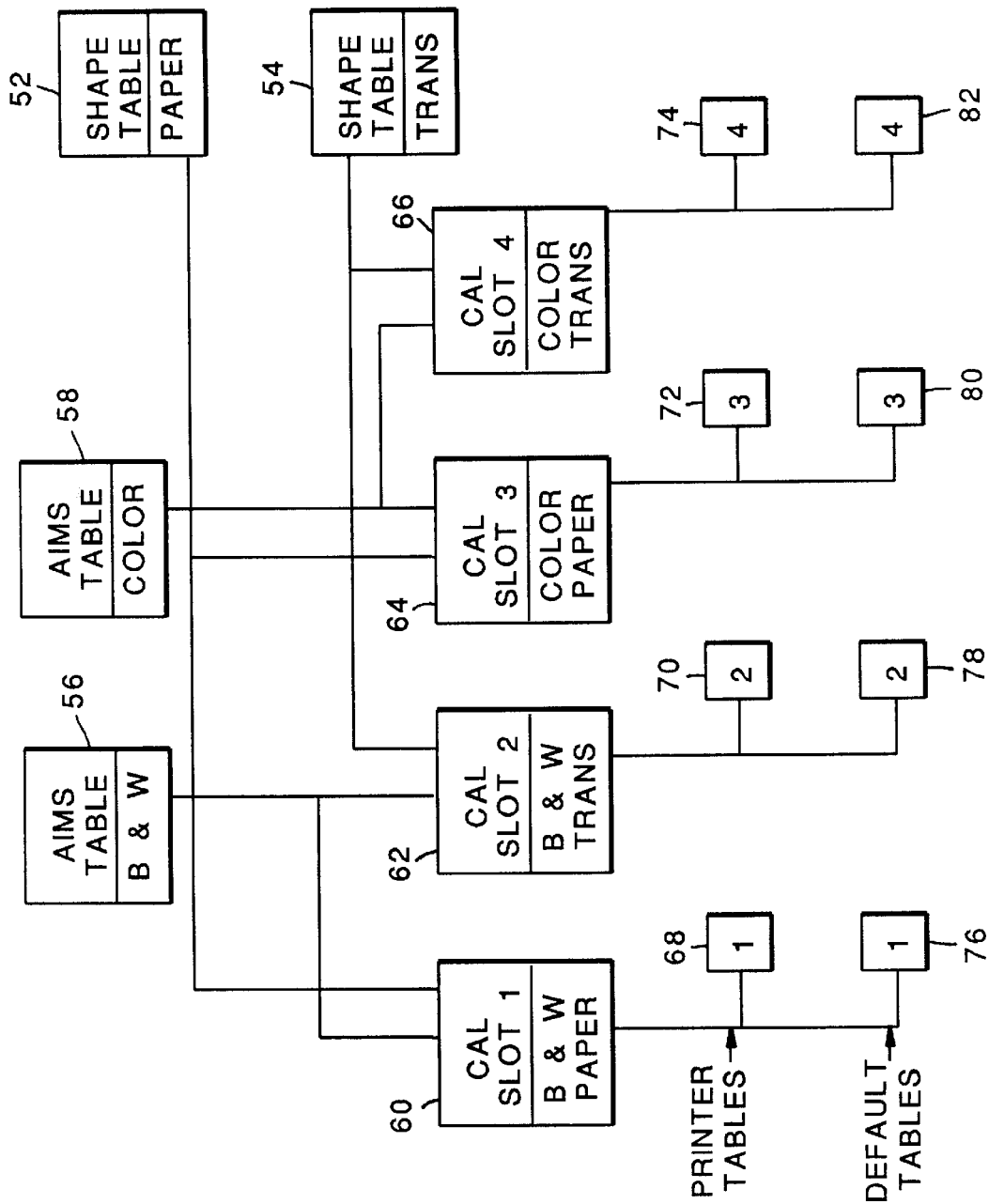
FIG. 5 is a diagram showing the relationships between calibration tables and slots for the printer control interface according to the present invention used in performing printer calibration.

Calibration is a complex process that varies considerably on different kinds of printers. The data components affecting the calibration process are:
  Calibration Slots
  Calibration Tables
  Aims Tables
  Shape Table (only needed for speed-shift calibration) FIG. 5 shows the relationship of these tables.

The Shape Tables may include for example paper shape tables 52 and transparency shape tables 54, which are stored in the module (or prefs file) and there is generally one per printer, but there may be more. They are used in speed shift calibration to specify how much the algorithm affects the calibration at various points along the calibration curve. The modification factor is a 16-bit number with a range of −32767 to 32767 which represents a modification factor range of −1.0 to 1.0. These tables are referenced in the calSlotType data structure and are usually shared by more than one cal slot.

The Aims Tables may include for example black and white aim tables 56 and color aim tables 58, which are also stored in the module and there may be one or more for a given printer. These tables are similar in format to the calibration tables, but represent a perfect calibration for the printer. Each table is a multi-column lookup table with a list of code values beside lists of the ideal print densities that the code value should produce for each color plane. The min and max values in the table represent the dmin and dmax of the system. Because different media may have different Aims curves, there can be more than one for a printer as shown in FIG. 5, and are usually shared by more than one cal slot.

Cal Slots 60, 62, 64 and 66 are essentially locations in the printer where cal tables can be stored. Printers may only have one but usually have many which are related to various combinations of page media, marking media, resolution, or other factors that affect calibration. The calSlotType data structures are descriptions (stored in the module) of the cal slots available in the printer. FIG. 5 shows 4 cal slots based on the possible combinations of B&W or Color marking media, and Paper or Transparency page media. Note that more than one cal slot may share an aims table.

Cal Tables are the actual data used to modify the response of the printer and change the way the print looks. Each cal slot will have at least two tables associated with it as shown in FIG. 5. One is the table 68, 70, 72, and 74 that is currently in the printer for the slot, and the other is the default table 76, 78, 80 and 82 for the slot which is stored in the extended export module. There may be other kinds of tables (such as factory default) for a given slot. The table of interest is specified using the whichTable field in the calTableType data structure when issuing calls relating to calibration tables.

Different printers can and usually do, use significantly different kinds of tables for calibration. Therefore, the first step in performing calibration for a printer is to determine table format using the GetCalTable call and specifying that the default table be read. Examine the fields in the returned data structure to determine what the number and order of the color planes should be and the length of each LUT. You should also read the aims table for the cal slot of interest, and the shape table if doing speed-shift calibration.

A calibration procedure for a generic printer might proceed as follows:
1) Determine the format of the required table using the GetCalTable call.
2) Use the SelectCalSlot call to let the user choose which table in the printer he wants to calibrate.
3) Send a job to the module that will print a test print with a desired number and layout of density patches. This might be specified by the user-interface in the host application and might use the default cal table as a starting point if the printer hadn't been calibrated before. Be sure to use the Calibration mode when making the printing calls (StartCustom, ContinueCustom, etc.)
4) After the user reads the density patches and enters the readings into the host application, the application should make a decision as to whether the printer is adequately calibrated.
5) If not, the host application should create a new calibration table based on the following factors:
  Previous calibration table used for the test print
  Knowledge of the kind of table the module needs
  Dmax for the currently loaded marking media. This can be found using the GetStatus and GetMarkingMediaList calls.
  Dmin for the currently loaded page media. This can be found using the GetStatus and GetPageMediaList calls.
  How far off the density readings are from the actual desired patch densities as specified in the aims table.
6) Send the calibration table to the module to calibrate the printer using the SetCalTable call, and send another job containing the test print. Return to step 3 and iterate the process until adequate calibration is achieved.

The invention has been described with reference to a preferred embodiment. However, it will be appreciated that variations and modifications can be effected by a person of ordinary skill in the art without departing from the scope of the invention.

PARTS LIST 10 printing system
12 central processor
14 printer
16 printer
18 printer
20 printer
22 communications interface
24 communications interface
26 operating system
28 communications services
30 host application
32 plug-in module
34 plug-in module
36 set selector number step
38 fill in needed data step
40 place pointer in data field step
42 call entry point step
44 check results field for errors step
46 sucessful call step
48 read data step
50 end steps
52 paper shape table
54 transparency shape table
56 black and white aims table
58 color aims table
60 black and white paper calibration slot
62 black and white transparency calibration slot
64 color paper calibration slot
66 color transparency calibration slot
68 printer table
70 printer table
72 printer table
74 printer table
76 default table
78 default table
80 default table
82 default table

I claim:

1. An improved printer control interface, for use with a computer printing system of the type having a central processor, an operating system software module in the central processor, a host application software module in the central processor running on the operating system software, a printer connected to the central processor, and a plug in software module in communication with the host application software module which receives image export application programming interface (API) calls from the host application software module for driving the printer, wherein the improvement comprises:

a) an extended suite of API calls, including, API support calls, custom user interface calls, printer calls and calibration calls wherein the extended suite of API support calls includes:
   a call to return a version number of an API supported by the plug in software module;
   a call to get a list of other calls supported by the plug in software module;
   a call that returns information about the plug in software module; and
   a call that frees up resources used by the plug in software module, b) an extended host application for executing the extended suite of API calls; and c) an extended plug in software module responsive to the extended suite of API calls for controlling the printer.

2. The improved printer control interface claimed in claim 1, wherein the extended host application is a printer calibration application, and wherein the extended suite of API calibration calls includes:
   a call to get a list of calibration types supported by the plug in software module;
   a call to set a table reference number for a calibration type;
   a call to bring up a module's user-interface for calibration settings;
   a call to read a calibration table from the printer or the plug in software module;
   a call to write a calibration table to the printer;
   a call to get a list of shape table reference numbers;
   a call to get a speed-shift shape table from the plug in software module;
   a call to set a speed-shift shape table in the plug in software module;
   a call to tell the plug in software module to delete one of it's shape tables;
   a call to get a list of aims tables available in the plug in software module;
   a call to get an aims table;
   a call to set an aims table;
   a call to tell the plug in software module to delete one of it's aims tables; and
   a call to read a default matching table from the plug in software module.

3. The improved printer control interface claimed in claim 1, wherein the plug in software module includes a user interface for allowing a user to specify printing options the extended host application is a print server application that disables the user interface and uses the extended suite of API calls to set the print options, and the extended suite API calls include:
   a call to get information about the printer;
   a call to return a status data structure with printer status;
   a call to bring up the plug in software module's user-interface to select the printer;
   a call to set the printer that the plug in software module will access;
   a call to return last job settings used by the plug in software module; a call to identify features supported by the plug in software module and the printer;
   a call to get a list of page media types supported;
   a call to get a list of marking media supported;
   a call to get a list of resolutions supported; and
   a call to get an icon of the printer for use it an application's user-interface.

* * * * *